United States Patent [19]

Hoving et al.

[11] Patent Number: 5,168,426
[45] Date of Patent: Dec. 1, 1992

[54] HINGE MECHANISM FOR COVER PANEL OF PORTABLE COMPUTER INCLUDING SLIDE MECHANISM

[75] Inventors: John R. Hoving, San Jose; Craig R. Davis, Newark; Michael J. Greaney, San Jose; James R. Flom, Palo Alto, all of Calif.

[73] Assignee: Beaver Computer Corporation, San Jose, Calif.

[21] Appl. No.: 746,380

[22] Filed: Aug. 16, 1991
(Under 37 CFR 1.47)

[51] Int. Cl.$^5$ .................. H05K 7/16; G06F 1/00; F16C 11/00; E05D 15/08
[52] U.S. Cl. .................. 361/392; 361/380; 403/80; 403/92; 16/361
[58] Field of Search .................. 403/80, 91, 92, 93, 403/95, 96; 364/708; 312/327; 248/284, 286, 447, 917, 918, 919, 920, 921, 923; 16/342, 345, 361, 366, 386; 361/380, 390, 391, 392, 393, 394, 395, 399

[56] References Cited
U.S. PATENT DOCUMENTS

| | | | |
|---|---|---|---|
| 1,920,898 | 8/1933 | Soule | 16/360 |
| 1,990,103 | 2/1935 | Alstyne | 248/447 |
| 2,208,887 | 7/1940 | Westward | 16/360 |
| 2,335,581 | 11/1943 | Cocanour | 16/366 X |
| 2,465,088 | 3/1949 | Gussack | 16/334 X |
| 2,721,635 | 10/1955 | Fullerton | 16/357 X |
| 3,324,502 | 6/1967 | Gehrie | 16/345 |
| 3,388,417 | 6/1968 | Upchurch | 16/360 X |
| 4,960,256 | 10/1990 | Chihara et al. | 248/917 X |

Primary Examiner—Leo P. Picard
Assistant Examiner—Michael W. Phillips
Attorney, Agent, or Firm—Skjerven, Morrill, MacPherson, Franklin & Friel

[57] ABSTRACT

A hinge mechanism for controlling the movement of the cover panel of a portable computer includes a pivot arm and a slide mechanism. The ends of the pivot arm are pivotally attached to the cover panel and to the housing of the computer, respectively. The cover panel is also pivotally attached to the slide mechanism, which slides along a track mounted in the housing of the computer. The pivot points provide a predetermined frictional resistance to rotational movement whereby the cover panel, which typically includes a display, may be stabilized in an upright position while the computer is in use.

11 Claims, 6 Drawing Sheets

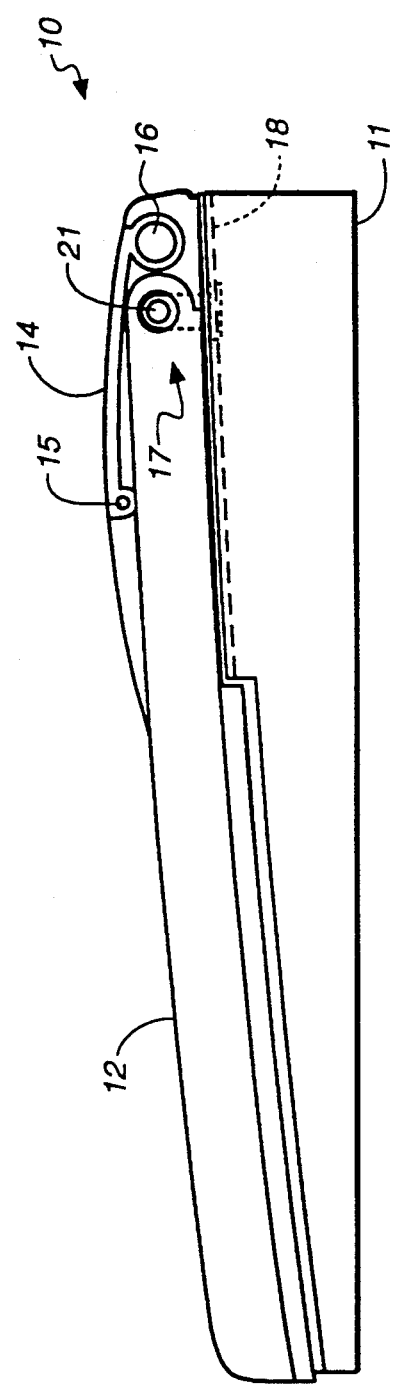
FIG._1A

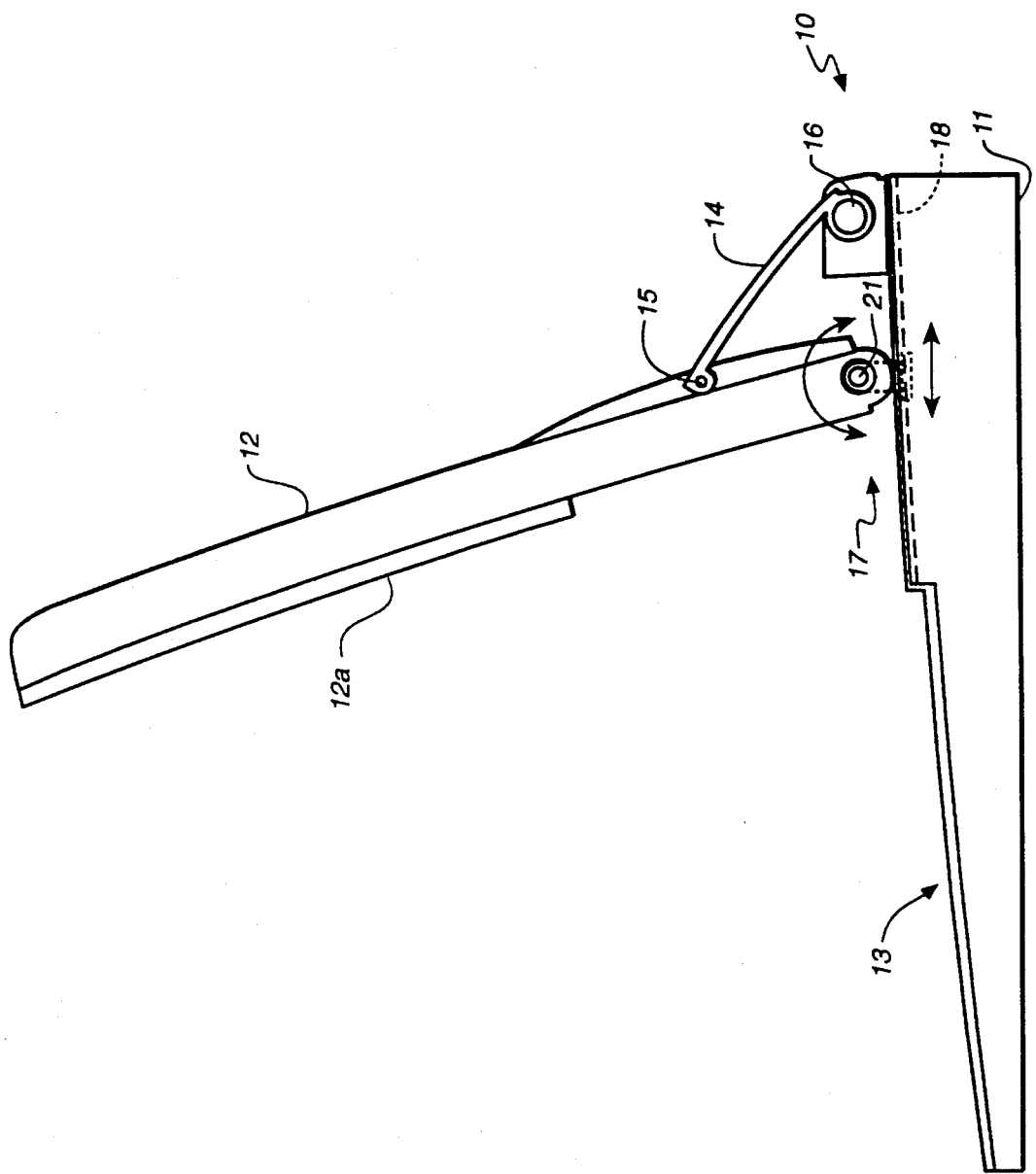
FIG._1B

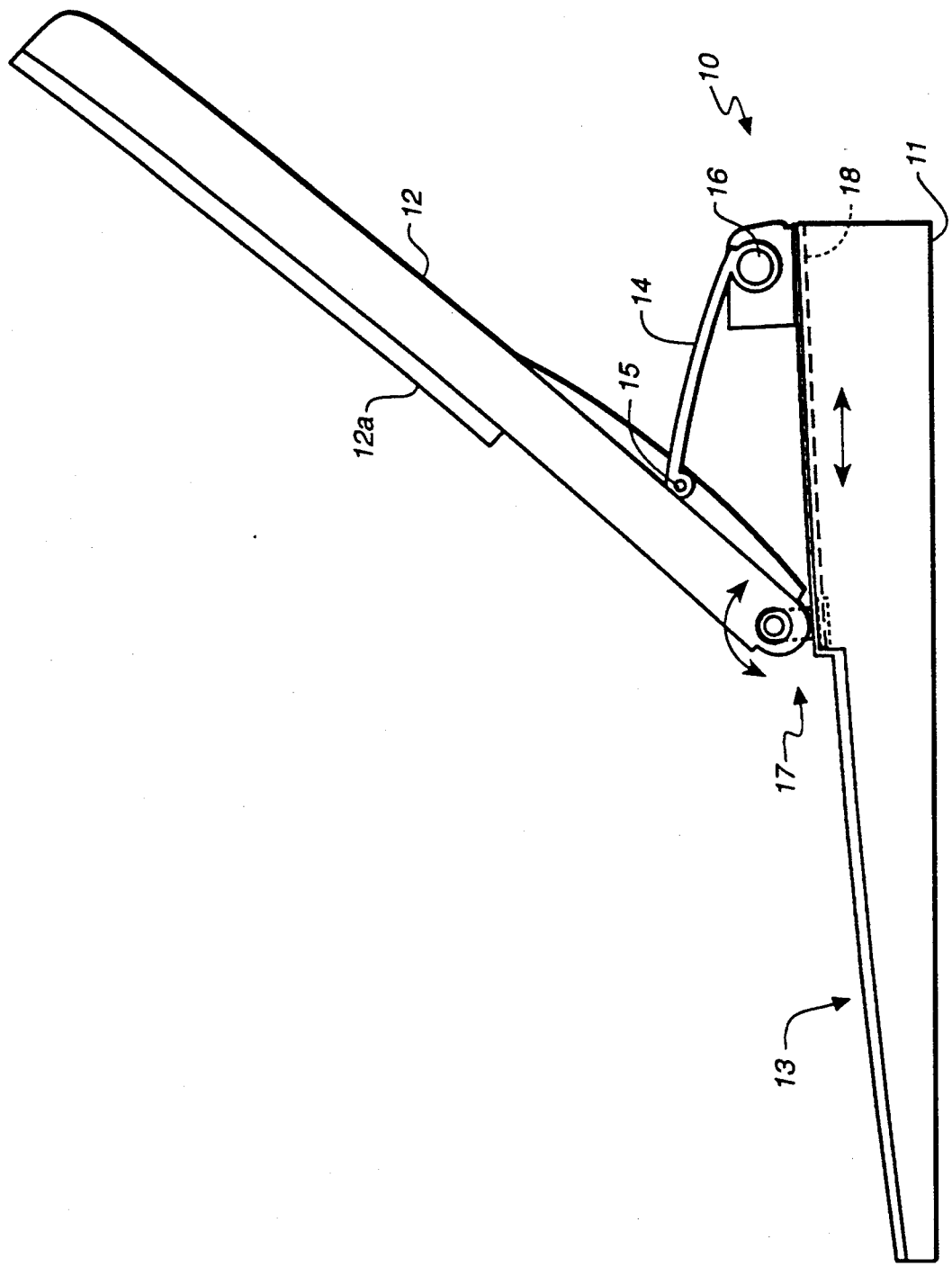
FIG._1C

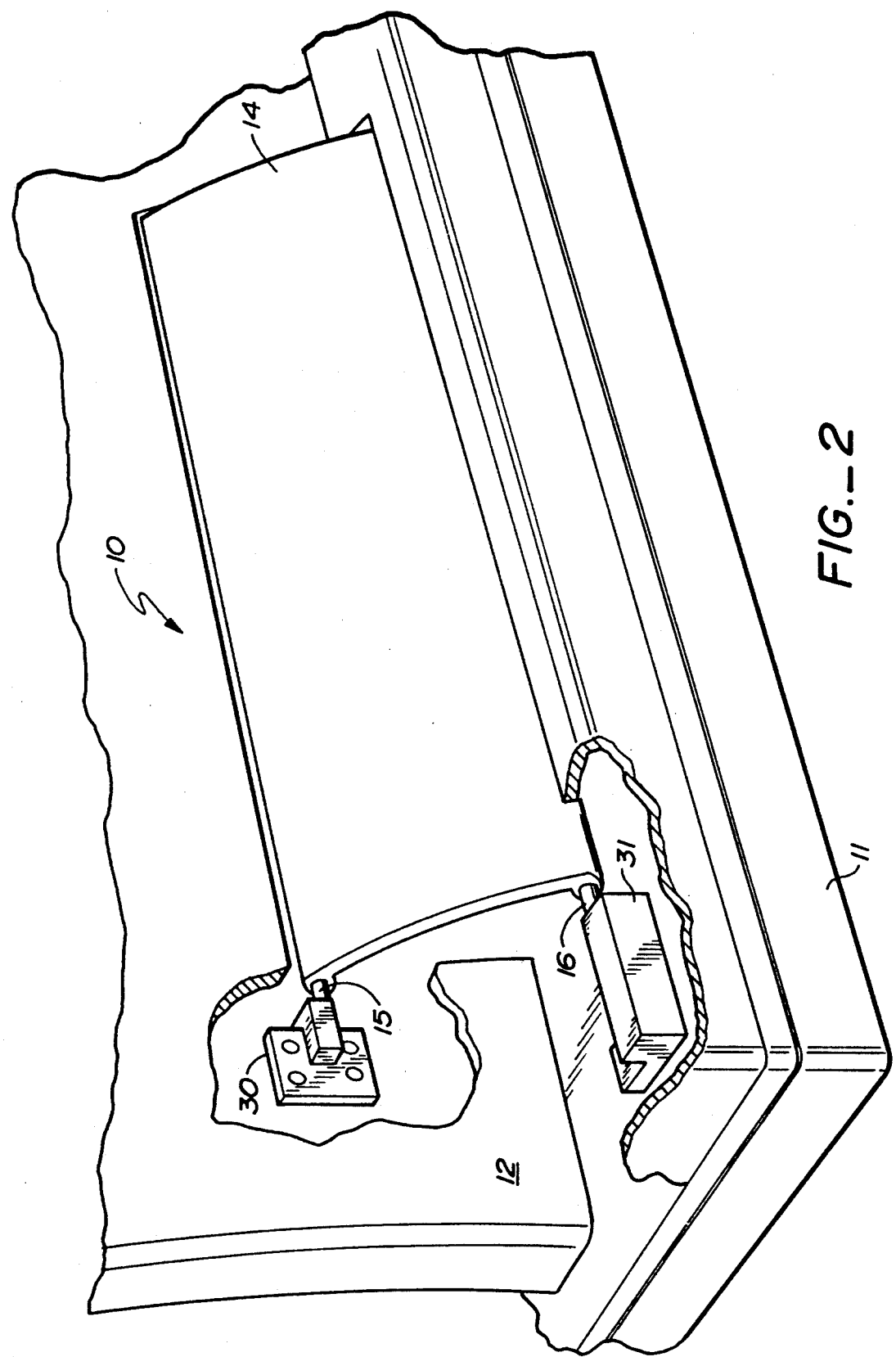
FIG._2

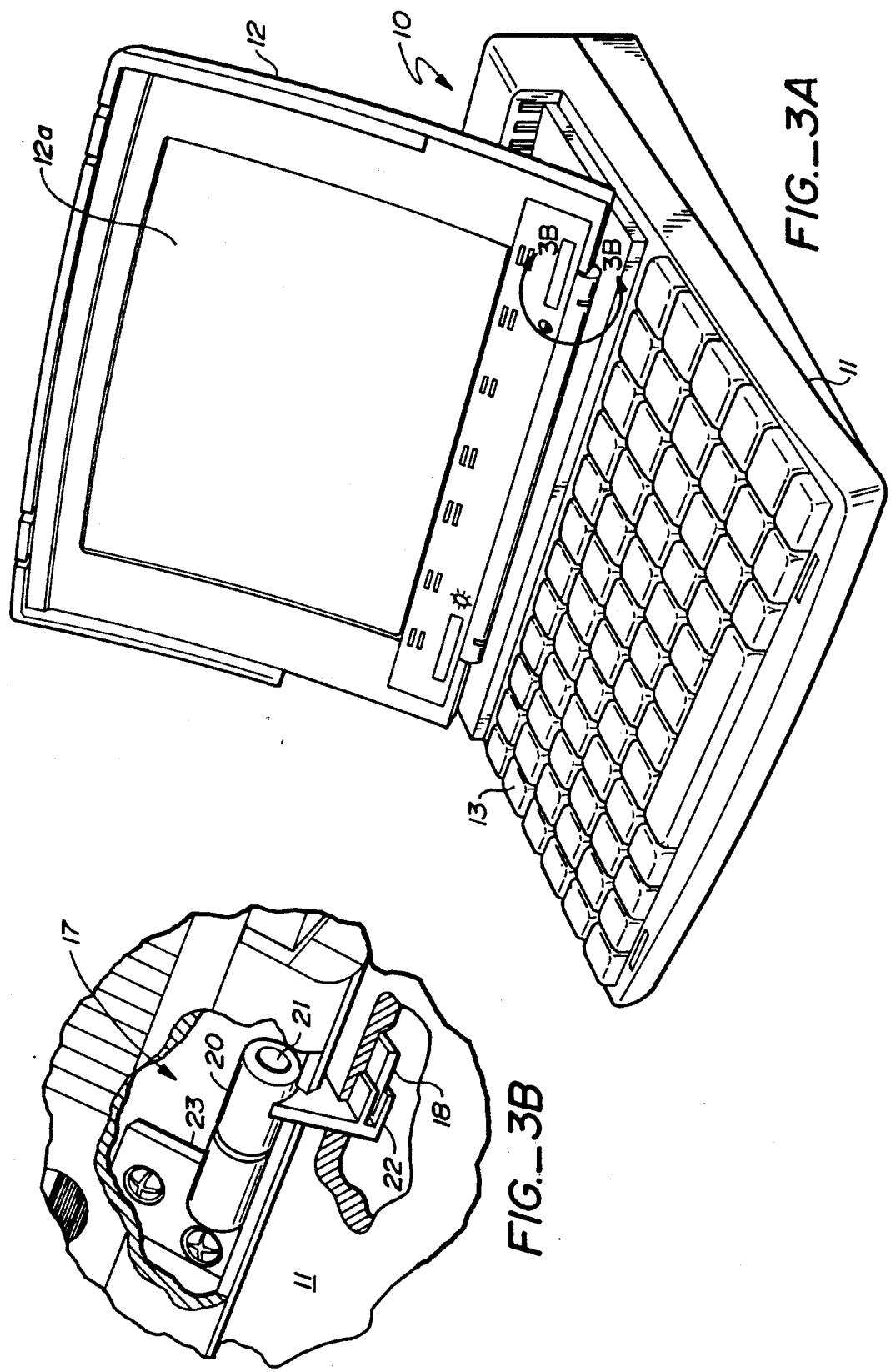

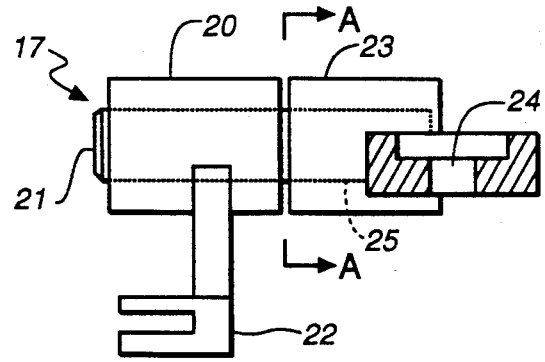
FIG._4A
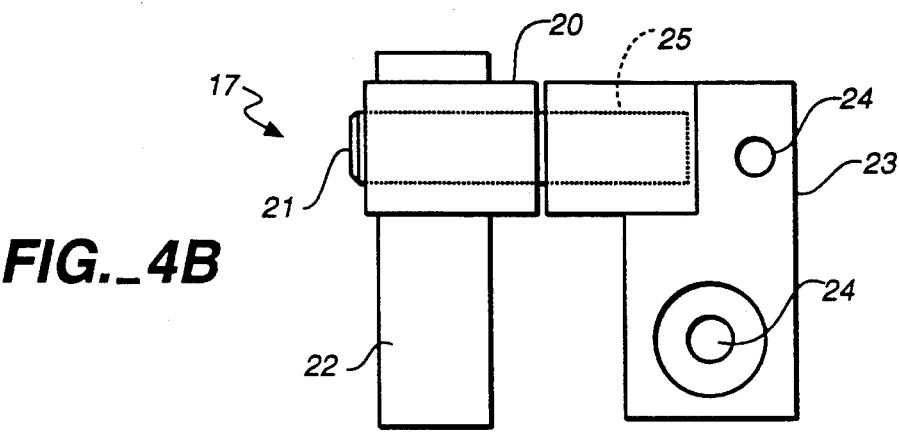
FIG._4B
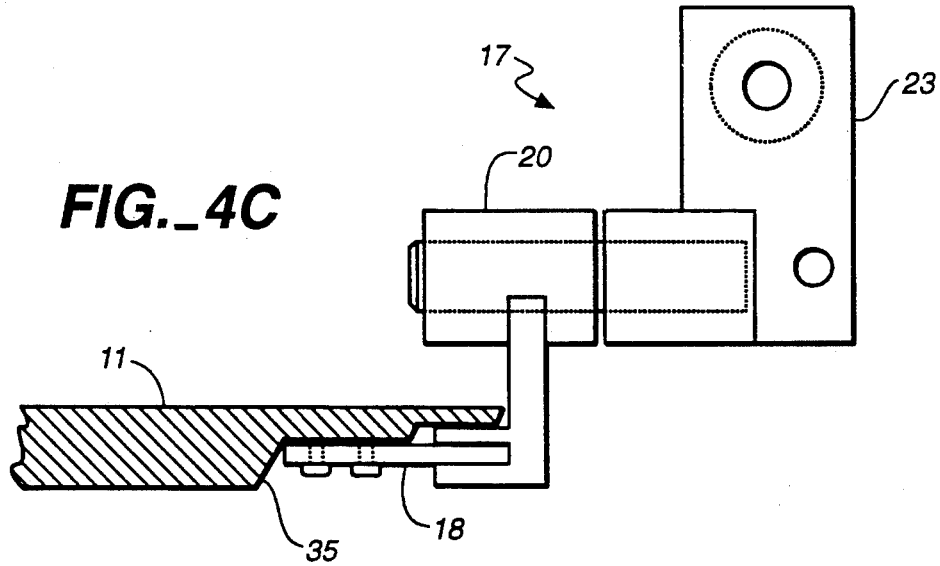
FIG._4C
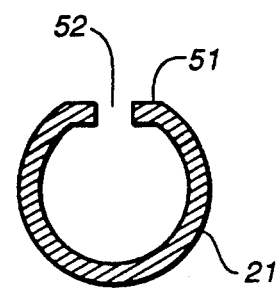
FIG._5

HINGE MECHANISM FOR COVER PANEL OF PORTABLE COMPUTER INCLUDING SLIDE MECHANISM

FIELD OF THE INVENTION

This invention relates to laptop, notebook and other portable computers and particularly to a hinge mechanism used for opening the cover panel of the computer so as to expose the keyboard and display.

BACKGROUND OF THE INVENTION

Portable computers, such as laptop or notebook computers, typically contain a hinged cover panel which may be lifted by the user to expose the keyboard and the display. The display is positioned on the inside of the cover panel so that it faces the user when the cover panel is lifted to its open position. Some portable computers use a simple pin hinge. Apart from being unattractive aesthetically, these hinges provide relatively little stability for the cover panel when it is open and require a separate mechanism to ensure that the display is stabilized in a readily viewable position when the user is operating the computer. Stability is particularly important in this situation since portable computers are often used in environments where they are subjected to bumps and jolts.

SUMMARY OF THE INVENTION

In accordance with this invention, the cover panel hinge mechanism of a portable computer includes three pivot points and a sliding mechanism which is associated with one of the pivot points. The cover panel of the computer is pivotally attached to a pivot arm at a position generally in its mid-section (i.e., between the front and rear edges of the cover panel). The opposite end of the pivot arm is pivotally attached to the housing of the computer. Near the rear (lower) edge of the cover panel, a sliding mechanism is pivotally attached to the panel. The sliding mechanism has a foot which slides along a track or guide which is provided in the housing of the computer. As the front edge of the panel is lifted by the user, the front end of the pivot arm is also lifted, and the sliding mechanism slides along the track towards the front (user) edge of the computer. Normally, the mechanisms are provided in a pair, with one mechanism being positioned at each side of the cover panel.

The cover panel is in its full open position when the sliding mechanism reaches a stop at the front end of the track. Depending on the user's preference, however, the cover panel need not be opened all the way. This is possible because a predetermined level of rotational friction is provided at one or more of the pivot points associated with the hinge mechanism, i.e., the point at which the cover panel is connected to the pivot arm, the point at which the pivot arm is connected to the housing, and the point at which the cover panel is connected to the sliding mechanism. In one embodiment, the rotational friction is provided at all three of these pivot points, with the highest level being provided at the point where the cover panel is connected to the pivot arm. As the cover panel approaches its vertical upright position these frictional resistances can only be overcome if the user pushes or pulls on the control panel so as to adjust its angular orientation with respect to the housing of the computer. Otherwise, the cover panel remains in whatever position the user has selected.

In a preferred embodiment, each pivot point includes a spring pin, and the frictional resistance is provided by friction between the spring pin and a sleeve or mounting block in which it is allowed to turn.

DESCRIPTION OF THE DRAWINGS

FIGS. 1A, 1B and 1C are side views showing a portable computer having a hinge mechanism in accordance with this invention, with the cover panel in closed, partially-open and open positions, respectively.

FIG. 2 is a rear perspective view of a portable computer in accordance with this invention, with a cutaway view of the mounting blocks at two of the pivot points.

FIG. 3A is a front perspective view of a portable computer in accordance with this invention. FIG. 3B is a cutaway view of the sliding mechanism associated with the third pivot point.

FIGS. 4A and 4B illustrate the means by which the sliding mechanism is pivotally attached to the cover panel, and FIG. 4C illustrates the manner in which the track is mounted in the housing of the computer.

FIG. 5 is an illustrative cross-sectional view of a spring pin.

DETAILED DESCRIPTION OF THE INVENTION

FIGS. 1A, 1B and 1C show a portable computer 10 with a hinge mechanism of this invention in closed, partially-open and open positions, respectively. Portable computer 10 includes a housing 11 and a cover panel 12 which covers a keyboard 13 when it is lowered to the closed position shown in FIG. 1A. A display 12a is mounted on the inside face of cover panel 12. A pivot arm 14 includes two spring pins 15 which allow pivot arm 14 and panel 12 to rotate with respect to each other. The other end of pivot arm 14 includes two spring pins 16 which allow pivot arm 14 and housing 11 to rotate with respect to each other. Only a single one of spring pins 15 and 16 is visible in FIGS. 1A, 1B and 1C.

FIG. 2 is a perspective view from the rear of computer 10 showing the relationship of housing 11, pivot arm 14 and cover panel 12. As shown in FIG. 2, spring pins 15 and 16 are journaled into mounting blocks 30 and 31, which are mounted in cover panel 12 and housing 11, respectively. From FIG. 2, it is evident that a similar set of spring pins 15 and 16 and mounting blocks 30 and 31 is mounted at the opposite side of pivot arm 14. Thus pivot arm 14 is free to rotate with respect to both cover panel 12 and housing 11 by means of pins 15 and 16, respectively.

Mounted on opposite sides of cover panel 12 is a pair of slide mechanisms 17. One of slide mechanisms 17 is shown in FIGS. 1A, 1B and 1C, and the manner in which slide mechanism 17 is mounted is shown in FIGS. 3A and 3B. From FIG. 3A it will be appreciated that a second slide mechanism 17 is mounted on the other side of cover panel 12. The pair of slide mechanisms 17 are identical, except one of the pair is a mirror image of the other.

Slide mechanism 17 is shown in FIGS. 4A and 4B, which are, respectively, rear elevational and top views of the slide mechanism 17 shown in the detail view of FIG. 3B. Slide mechanism 17 includes a slide piece 20 and a spring pin 21. Slide piece 20 contains a split foot 22 which slides along a track 18 mounted in housing 11 (see FIG. 3). Accordingly, while slide piece 20 slides freely along track 18, its angular orientation with respect to housing 11 is fixed. Slide mechanism 17 also contains a mounting block 23 which is mounted in cover panel 12 by means of a screws (not shown) extending through holes 24. Mounting block 23 contains a hole 25 into which an end of spring pin 21 is inserted. The position and manner in which mounting block 23 is mounted on cover panel 12 are illustrated in FIG. 3.

FIG. 4C is a cross-sectional view showing how track 18 is mounted in housing 11. A recess 35 is formed in the underside of the top panel of housing 11. Recess 35 is sized such that when track 18 is mounted in recess 35, the bottom surface of slide piece 20 protrudes no further into the interior of the computer than the lower surface of housing 11. Thus, the mounting of slide piece 20 does not detract from the total amount of space available to hold internal components of the computer.

From an examination of FIGS. 1A, 1B and 1C, it is evident that the movement of cover panel 12 is governed by three pivot points coinciding with spring pins 15, 16 and 21, respectively, and by the movement of slide piece 20 along track 18. In a preferred embodiment, each of spring pins 15 and 16 is press-fitted into holes formed in pivot arm 14 so as to prevent them from rotating with respect to pivot arm 14. Spring pin 21 is press-fitted into a hole formed in slide piece 20 so as to prevent it from rotating with respect to slide piece 20.

Accordingly, the predetermined rotational friction at the pivot points associated with spring pins 15, 16 and 21 is provided by the rotation of spring pins 15, 16 and 21 in corresponding holes formed in mounting blocks 30, 31 and 23, respectively. Frictional resistance need not be provided at each of spring pins 15, 16 and 21, although doing so reduces the wear caused by the slippage of spring pins 15, 16 and 21 in mounting blocks 30, 31 and 23, and increases the overall stability of the structure. A particularly stable structure is obtained by providing a somewhat greater level of rotational friction at spring pin 15 than at either of spring pins 16 or 21. However, this is not required and other satisfactory arrangements can be developed.

In the preferred embodiment, the piece within which each spring pin is to rotate (mounting blocks 30, 31 and 23), is constructed of nylon to which 30% carbon fibers and 15% TEFLON material (fluorocarbon PTFE) have been added. Slide piece 20 is constructed of nylon containing 30% carbon fibers (but not TEFLON material). Track 18 is constructed of stainless steel.

To prevent spring pins 15, 16 and 21 from shaving the inside surfaces of the corresponding holes in mounting blocks 30, 31 and 23 in which they rotate, each spring pin may be formed with a flat portion adjacent to the split portion of the spring pin. The cross-sectional view of FIG. 5 shows a cross-sectional view of spring pin 21 taken at section A—A in FIG. 4A having a flat portion 51 near a gap 52.

The proper relationship between the outside diameters of spring pins 15, 16 and 21 and the respective inside diameters of the corresponding holes in mounting blocks 30, 31 and 23 assures a combined frictional moment of force sufficient to maintain cover panel 12 in a stationary position when display 12a is being viewed by the operator. In the preferred embodiment, spring pins 15, 16 and 21 are manufactured of stainless steel. Spring pin 15 has an outside diameter of 2.28 mm (0.090") and the corresponding hole in mounting block 30 has an inside diameter of 2.1 mm (0.083"); spring pin 16 has an outside diameter of 3.2 mm (0.126") and the corresponding hole in mounting block 31 has an inside diameter of 3.0 mm (0.118"); and spring pin 21 has an outside diameter of 4.32 mm (0.170") and hole 25 has an inside diameter of 4.0 mm (0.157"). This provides an appropriate frictional torque of 2.5 in-lbs at spring pin 21, 1.5 in-lbs at spring pin 15, and 2.0 in-lbs at spring pin 16, which is sufficient to stabilize cover panel 12 in an open position while allowing it to be opened and closed easily by the user.

Alternative materials and dimensions can readily be identified by those skilled in the art. Also, spring pins 15, 16 and 21 can be press-fitted into mounting blocks 30, 31 and 23, and a frictional resistance can be provided between the surface of spring pins 15, 16 and 21 and the corresponding holes in housing 11 and slide piece 20. Other means of providing a resistance to relative rotational movement are also included within the scope of this invention.

The hinge mechanism of this invention allows cover panel 12 to be stabilized without relying on frictional resistance between slide piece 20 and track 18. Slide piece 20 may accordingly slide freely in track 18, and there is no need for any additional structure or mechanism in housing 12 to create friction between these elements. This saves space, which is at a premium in a portable computer.

The embodiment described above is illustrative and not limiting of the invention. Many additional and alternative embodiments will be apparent to those skilled in the art, all of which are within the broad scope of this invention.

We claim:

1. A portable computer comprising:
  a housing;
  a cover panel which covers a keyboard of said computer when said cover panel is in a closed position;
  a pivot arm pivotally connected to said cover panel at a first pivot point and pivotally connected to said housing at a second pivot point, said pivot arm allowing relative rotational movement between said cover panel and said housing so as to permit said cover panel to be lifted from said closed position to an upright position;
  a slide member pivotally connected to said cover panel at a third pivot point and slidably engaging a track in said housing, said slide member comprising a surface which mates with a surface of said track so as to maintain said slide member in a substantially fixed angular orientation as said cover panel is lifted to an upright position.

2. The portable computer of claim 1 comprising a means for providing a predetermined resistance to relative rotation between said slide member and said cover panel at said third pivot point as said cover panel is lifted from said closed position to said upright position.

3. The portable computer of claim 2 wherein said means for providing a resistance comprises a spring pin inserted into a hole formed in a mounting block fixed to said cover panel, said frictional resistance being provided by friction between the outside surface of said spring pin and the inside surface of said hole.

4. The portable computer of claim 3 wherein the portion of said mounting block which is in contact with said spring pin comprises a material comprising nylon, carbon fibers and fluorocarbon-PTFE.

5. The portable computer of claim 4 wherein said material consists of 55% nylon, 30% carbon fibers and 15% fluorocarbon-PTFE.

6. The portable computer of claim 5 wherein said track comprises stainless steel.

7. The portable computer of claim 1 comprising two of said slide members, wherein said cover panel has two side edges, each of said slide members being pivotally connected to said cover panel at a location spaced from said side edges.

8. The portable computer of claim 1 comprising only a single pivot arm pivotally connected to said cover panel and to said housing, said pivot arm having lateral sides, and wherein said first and second pivot points each comprise a pair of pivot points located adjacent the sides of said pivot arm.

9. The portable computer of claim 1 wherein said slide member comprises a split foot having two projections said track being fitted into a gap between said projections.

10. The portable computer of claim 9 wherein said housing includes a top panel having a lower surface and said track comprises a metal strip, said metal strip being mounted in a recess formed in the lower surface of said top panel.

11. The portable computer of claim 10 wherein said top panel encloses the interior of said computer and said split foot protrudes into said interior no further than the lower surface of said top panel.

* * * * *